Figure 1:
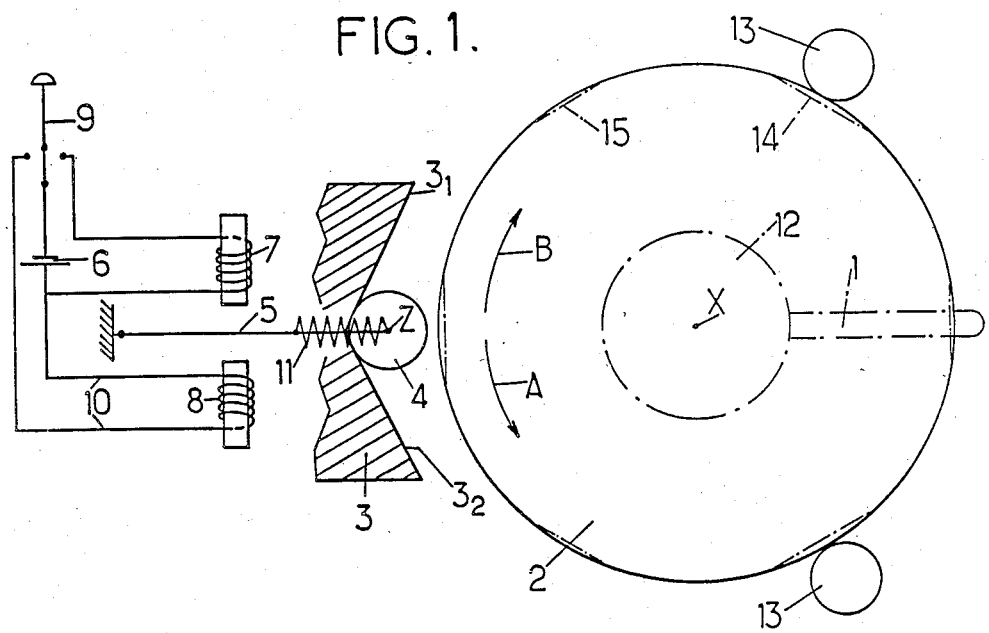

United States Patent [19]

Ulmann

[11] Patent Number: 4,658,940

[45] Date of Patent: Apr. 21, 1987

[54] ANGULAR NON RETURN DEVICES

[75] Inventor: Jean-Pierre Ulmann, Paris, France

[73] Assignee: Eyablissements Georges Klein, France

[21] Appl. No.: 789,596

[22] Filed: Oct. 21, 1985

[51] Int. Cl.⁴ ............. E06B 11/08; F16D 49/00
[52] U.S. Cl. ..................... 188/265; 49/46; 188/74; 188/82.2; 188/82.3; 188/82.84; 188/161
[58] Field of Search ............ 188/265, 262, 163, 161, 188/136, 82.84, 82.8, 82.2, 82.1, 82.3, 82.34, 82.4, 82.5, 74; 49/46, 43; 192/44

[56] References Cited

U.S. PATENT DOCUMENTS

| 224,168 | 2/1880 | French | 192/44 |
| 489,480 | 1/1893 | Jacot | 188/82.3 |
| 3,531,894 | 10/1970 | Bates et al. | 49/46 |
| 3,789,960 | 2/1974 | Warren | 188/74 |
| 3,978,613 | 9/1976 | Hayward et al. | 49/46 |
| 4,434,878 | 3/1984 | Okubo | 192/44 X |

FOREIGN PATENT DOCUMENTS 1146683 11/1957 France ................. 188/82.2

Primary Examiner—Andres Kashnikow
Assistant Examiner—Richard R. Diefendorf
Attorney, Agent, or Firm—Townsend and Townsend

[57] ABSTRACT

An angular non return device is provided associated with a turnstile (1) having an axis X and capable of acting at will in one or the other direction. This device comprises a drum of revolution (2) integral with the turnstile and coaxial therewith, a fixed vee (3) whose bisecting plane contains the axis X, a roller (4) interposed between the vee and the drum and mounted on a lever (5) so that it may be moved between a first end position in which it is locked by jamming between the drum and a face ($3_1$) of the vee and a second end position in which it is locked by jamming between the drum and the other face ($3_2$) of the vee, and electromagnetic elements (6 to 10) for urging the roller at will towards one or other of its two end positions. Portions (14, 15) of the drum are recessed so as to prevent locking of the turnstile in certain angular positions.

4 Claims, 2 Drawing Figures

U.S. Patent   Apr. 21, 1987   4,658,940

ANGULAR NON RETURN DEVICES

The invention relates to devices which are associated with rotary assemblies for allowing angular movements thereof in a given direction while instantaneously preventing angular returns or movements thereof in the direction opposite the preceding one.

It relates more particularly, among these devices, to those which are adapted so as to be able to exert at will their instantaneous angular locking role in one direction or in the other and which for this comprise a drum of revolution with axis X integral with the rotary assembly and coaxial with this assembly, a fixed vee whose bisecting plane contains the axis X of the drum, this vee being open on this drum side and disposed at a small distance therefrom, a roller with axis parallel to axis X, interposed between the vee and the drum and mounted so that it may be moved, on a mobile support, between a first end position in which it is locked by jamming between the drum and a face of the vee and a second end position in which it is locked by jamming between the drum and the other face of the vee, means constantly urging the roller towards its mean position in which it is opposite the bottom of the vee and electromagnetic means for urging the support at will towards one or other of its two end positions.

Such a double acting angular non return device has for example been described in French Pat. No. 1 146 683 which relates to a free wheel intended to equip the transmission shaft of a motor vehicle.

For such an application, the angular positions of the shaft to be locked are immaterial.

The invention relates to another application in which these positions are not immaterial, namely turnstiles for access control.

In these apparatus, the angular non return of the mobile arms must not be provided strictly in their closure or barrier positions, but on the contrary allow a certain free angular movement on each side of these positions.

The purpose of the invention is especially to make such free movements possible. For this, the non return devices of the above kind in accordance with the invention, for which the rotary assembly is a turnstile, are essentially characterized in that the portion of the drum disposed radially opposite the roller for each barrier position of the turnstile, is recessed so as to prevent any locking contact between this portion and the roller.

In the preferred embodiments, recourse is further had to one and/or other of the following arrangements:

the pin of the roller is retained on the support at a sufficient distance from the shaft of the drum so that this roller cannot come into contact with the bottom of the recessed portion, each recessed portion has the form of a flattening, the drum comprises other recessed portions each situated angularly half way between two of the preceding recessed portions.

The invention comprises, apart from these main arrangements, certain other arrangements which are preferably used at the same time and which will be more explicitly discussed hereafter. In what follows, a preferred embodiment of the invention will be described with reference to the accompanying drawings in a way which is of course in no wise limiting.

Figure 2:
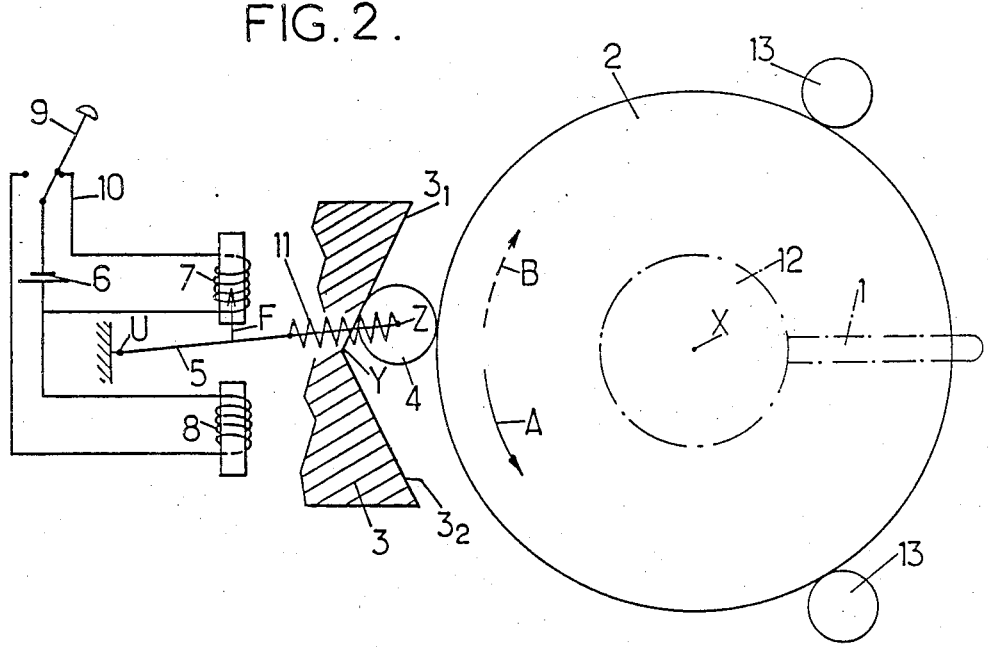

FIGS. 1 and 2 of these drawings show an angular non return device with two locking directions associated with a three arm turnstile and constructed in accordance with the invention, in two different states corresponding respectively to the absence of any locking of the turnstile and to the locking thereof in one direction.

The turnstile in question is shown schematically by an arm 1 mounted for pivoting about an axis X.

This turnstile is associated with any desirable locking, control, spring return, damping means . . . : these means are known and do not form part of the invention so they will not be described in the present description.

In the known embodiments of turnstiles, the angular movements thereof are permitted in a first direction under certain conditions, such as the previous introduction of a valid ticket into an associated apparatus, and they are prevented in the opposite direction, at least beyond a given amplitude.

It is proposed here to prevent the angular movements of the turnstile at will in one or other of the two possible directions A and B for these movements.

For this, recourse is had to a non return device comprising:

a drum of revolution 2 with a shaft angularly integral with the turnstile 1, a vee 3 defined externally by two flat ramps $3_1$ and $3_2$ which intersect along a straight line Y parallel to axis X, this vee being turned towards the drum and its bisecting plane comprising the axis X, a roller 4 with axis Z parallel to axis X interposed between drum 2 and the vee 3 and mounted on a mobile support 5 so as to be able to move between a first end position in which it is jammed between a ramp $3_1$ of the vee and the drum and another end position in which it is jammed between the other ramp $3_2$ of the vee and the drum, and electromagnetic means for moving the support 5 from one to the other of its two end positions.

For obtaining the above mentioned jamming effects, the distance between each ramp $3_1$ and $3_2$ and the drum must be slightly less than the diameter of roller 4.

The electromagnetic means comprise:

a source 6 of DC electric current, two electromagnets 7 and 8 disposed on each side of the support 5, a three position switch 9, and an electric circuit 10 designed so that the respective placing of switch 9 in its three positions corresponds respectively to energization of the electromagnet alone, to the de-energization of the two electromagnets and to the energization of electromagnet 8 alone.

Support 5 is advantageously formed by a lever mounted for pivoting about an axis U parallel to axis X, which lever is formed at least partially from a magnetic material so as to be sensitive to the attraction or repulsion forces of the electromagnets 7 and 8.

A spring 11 constantly urges the roller 4 to the bottom of the vee 3. in which position it is spaced away from drum 2.

The operation of the device is as follows.

When neither of the electromagnets 7 and 8 is energized, roller 4 is applied to the bottom of the vee 3.

The rotational movements of drum 2 are then free in both directions A and B, as well as those of the turnstile 1 to which this drum is angularly secured.

If the electromagnet 7 is energized by moving switch 9 in the adequate direction (FIG. 2), the support 5 is attracted magnetically by this electromagnet in the direction of arrow F, which drives roller 4 to its end position in which it is jammed between ramp $3_1$ and drum 2.

For this end position, the rotational movements of drum 2—and so those of turnstile 1—are still possible in direction A, but no longer in the opposite direction B for roller 4 then exerts a jamming effect in this direction; in fact, any attempt to move drum 2 angularly in this direction B tends to drive this roller in said direction because of the friction which exists between the roller and the drum; now, such driving is not possible because of the narrowing defined by the facing surfaces of ramp $3_1$ and the drum 2 beyond the end position then occupied by roller 4.

Such angular locking in direction B is automatically suppressed by bringing switch 9 back to its original position since the force of attraction of the electromagnet 7 is then suppressed, which allows roller 4 to return resiliently to the bottom of the vee 3.

Considering the symmetry of the device, it is clear that the actuation of switch 9 in the direction opposite the preceding one results automatically in the angular locking of drum 2, and so of turnstile 1, in direction A by jamming of roller 4 between drum 2 and ramp $3_2$ of the vee while then allowing rotational movements of the drum and of the turnstile in direction B.

It should be noted that the simultaneous de-energization of the two electromagnets 7 and 8 releases the turnstile angularly, as is normally required in the case of current failures by the specifications for such apparatus.

The peripheral tracks of revolution along which the drum 2 and roller 4 are applied against each other are preferably cylindrical, but they could also have any other profiles complementary to each other and fitting one in the other.

Similarly, one of these two tracks may form the bottom of a groove whose sides overlap the other track.

Constructions of similar types, i.e. with mutually imbricated or mutually overlapping surfaces, may also be provided for the mutually coacting surfaces of the vee 3 and of roller 4.

The materials forming the different bearing surfaces and tracks considered of the drum 2, of the vee 3 and of the roller 4 are chosen so as to have adequate friction coefficients: it is in general a question of special treated steels, but all other materials, plastic or other, could be provided.

For relieving shaft 12 of the turnstile 1 of the transverse thrust exerted thereon by roller 4, at least one other roller 13 is advantageously provided forming a stop adapted for rolling against the face of drum 2 the furthest away from said roller 4: so as to provide a good balance, two such rollers 13 are preferably provided disposed symmetrically to each other with respect to the plane which contains the axis X and the straight line Y.

The angular non return of the turnstile must not be provided rigourously in its closure position; on the contrary, a certain free angular movement of this turnstile must be allowed about each of said positions.

Thus, during each closure of the turnstile following opening thereof, the arm which is to provide the closure is positioned very rapidly and may go beyond its final closure position before coming back thereto through a dampened oscillation about said position; similarly, in some cases, in order to identify the permission to pass each time may require a beginning of angular movement of the turnstile, which implies a possibility of the return thereof to its closure position if the passage is not allowed.

For this, recesses 14 are formed in the periphery of revolution of the drum 2 which are sufficiently deep so that roller 4 cannot reach the bottom thereof, even in its above defined endmost jamming positions, these recesses being opposite this roller for the stable closure positions of the turnstile.

Roller 4 is then advantageously mounted on its support 5 so that its axis Z is retained on said support at a sufficient distance from axis X.

In the case described here of a turnstile with three arms, the recesses 14 are three in number, offset angularly from each other by 120° and advantageously each defined by a plane parallel to axis X defining a flattening on the periphery of the drum, which flattening has an angular extent of the order of 10° to 30°.

When driving of the turnstile towards its stable closure positions is controlled by cooperation of a three lobe cam integral with this turnstile and a roller resiliently applied against this cam, it may be advantageous to further provide three other recesses 15 in the periphery of drum 2, each of these recesses 15 being disposed angularly half way between two recesses 14.

In fact, in such a case, a stable position, even precarious, of the turnstile should be avoided for the intermediate angular positions of this turnstile corresponding to the maximum freeing of the passage between the turnstile and the opposite casing; now, the presence of the above described non return mechanism could make such precarious stable positions possible in some cases if said recesses 15 were not provided.

In general, the turnstiles with which non return devices of the above described kind are associated are equipped with a separate angular locking system, comprising a recessed plate and a locking finger adapted for coacting with these recesses and itself controlled by the means for checking and allowing passageway.

It should be noted that the non return mechanisms considered here may themselves assume these locking functions: for this it is sufficient to adapt the passageway control and authorizing means so that they control the selective energizations of electromagnets 7 and 8.

Thus, if passageway is to be allowed in direction A on the presentation of a justificatory piece, it is sufficient:

to normally energize the electromagnet 8, which automatically locks the turnstile 1 at rest in said direction A, to automatically reverse the position of switch 9 at each identification of a correct justificatory piece which frees the turnstile in direction A while instantaneously locking it in the opposite direction B, then to bring the whole back automatically to its original state as soon as the turnstile reaches its next closure position.

Such a characteristic has the advantage of considerably simplifying the unit controlling the turnstile since it allows the recessed plate of the preceding apparatus as well as its accessory to be completely omitted.

Following which and whatever the embodiment adopted, an angular non return device is finally obtained capable of exerting its locking effect at will in one or the other direction, whose construction, operation and advantages follow sufficiently from the foregoing.

As is evident, and as it follows moreover already from what has gone before, the invention is in no wise limited to those of its modes of application and embodiments which have been more especially considered; it embraces, on the contrary, all variants thereof, especially:

those in which the spring 11 constantly urging the roller 4 to the bottom of the vee 3 is omitted, said roller being then mounted practically freely idling between its two end positions when neither of the two electromagnets 7 and 8 is energized, those in which the mobile support 5 supporting roller 4 is formed by an element other than a lever, for example by a slide adapted to move in the direction perpendicular to the bisecting plane of the vee 3, while allowing movements of the axis of the roller perpendicular to this direction, those in which the two electromagnets 7 and 8 are replaced by a single electromagnet capable of placing the support 5 of the roller in its first end position when it is energized, return of this support to its opposite end position then being provided by resilient means.

I claim:

1. An angular non return device associated with a turnstile (1) comprising a drum of revolution (2) about a first axis integral with and coaxial with said turnstile; a V-shaped member (3) defined by first and second faces intersecting at a vertex whose bisecting plane contains said first axis, said V-shaped member being open in the direction of said drum and disposed at a small distance therefrom; a roller (4) with a second axis parallel to said first axis, interposed between said V-shaped member and said drum and mounted on a mobile support (5) permitting said roller to be moved between a first end position in which said roller is locked by jamming between said drum and said first face ($3_1$) of said V-shaped member and a second end position in which said roller is locked by jamming between said drum and said second face ($3_2$) of said V-shaped member; means (11) constantly urging said roller (4) toward said vertex of said V-shaped member and electromagnetic means (6 to 10) for urging said mobile support at will toward a selected one of said first and second end positions; and a recess in the surface of said drum (2) disposed radially opposite said roller for at least one preselected stop position of said turnstile to prevent any locking contact between said recess and said roller (4).

2. The device according to claim 1, in which said second axis is retained on said mobile support (5) at a sufficient distance from said first axis to prevent contact between said roller and said recess.

3. The device according to claim 1, in which said recess is flat.

4. The device according to claim 1, in which said preselected stop positions are plural in number, and said device further comprises an additional recess situated angularly half way between each adjacent pair of said stop positions.

* * * * *